(12) United States Patent
Sudo et al.

(10) Patent No.: US 9,014,762 B2
(45) Date of Patent: Apr. 21, 2015

(54) CHARACTER INPUT DEVICE, CHARACTER INPUT METHOD, AND CHARACTER INPUT PROGRAM

(75) Inventors: Tomohiro Sudo, Yokohama (JP); Hideko Murakami, Yokohama (JP)

(73) Assignee: Kyocera Corporation, Kyoto (JP)

( * ) Notice: Subject to any disclaimer, the term of this patent is extended or adjusted under 35 U.S.C. 154(b) by 187 days.

(21) Appl. No.: 13/819,594

(22) PCT Filed: Aug. 26, 2011

(86) PCT No.: PCT/JP2011/069315
§ 371 (c)(1),
(2), (4) Date: Feb. 27, 2013

(87) PCT Pub. No.: WO2012/026590
PCT Pub. Date: Mar. 1, 2012

(65) Prior Publication Data
US 2013/0157727 A1    Jun. 20, 2013

(30) Foreign Application Priority Data
Aug. 27, 2010    (JP) .................................. 2010-191545

(51) Int. Cl.
| | |
|---|---|
| H04B 1/38 | (2006.01) |
| G09G 5/00 | (2006.01) |
| H04M 1/247 | (2006.01) |
| G06F 3/023 | (2006.01) |
| G06F 3/0488 | (2013.01) |

(52) U.S. Cl.
CPC ............. *H04M 1/247* (2013.01); *G06F 3/0237* (2013.01); *G06F 3/04883* (2013.01); *H04M 2250/22* (2013.01); *H04M 2250/70* (2013.01)

(58) Field of Classification Search
USPC ........................ 455/566, 414.1; 345/156, 173
See application file for complete search history.

(56) References Cited

U.S. PATENT DOCUMENTS

| | | | |
|---|---|---|---|
| 6,498,601 B1 | 12/2002 | Gujar et al. | |
| 7,050,046 B1 * | 5/2006 | Park et al. | ..................... 345/173 |

(Continued)

FOREIGN PATENT DOCUMENTS

| | | |
|---|---|---|
| JP | 2001-202191 A | 7/2001 |
| JP | 2003-141448 A | 5/2003 |

(Continued)

OTHER PUBLICATIONS

International Search Report and Written Opinion corresponding to PCT/JP2011/069315, dated Dec. 6, 2011.

*Primary Examiner* — Blane J Jackson
(74) *Attorney, Agent, or Firm* — Lowe Hauptman & Ham LLP

(57) ABSTRACT

According to an aspect, a character input device includes: a display unit; a touch sensor for detecting a contact with a surface thereof; a character recognition processing unit for performing a first character recognition process for recognizing a character used for a first function and a second character recognition process for recognizing a character used for a second function, on the basis of a locus connecting positions where the contact is detected by the touch sensor; and an input control unit for displaying, on the display unit, a first input screen for the first function onto which the character recognized by the first character recognition process is input and/or a second input screen for the second function onto which the character recognized by the second character recognition process is input.

14 Claims, 11 Drawing Sheets

(56) References Cited

U.S. PATENT DOCUMENTS

| 8,174,496 B2* | 5/2012 | Sagong | 345/156 |
| 2010/0081375 A1* | 4/2010 | Rosenblatt et al. | 455/41.1 |
| 2012/0056806 A1* | 3/2012 | Rosenberg et al. | 345/157 |

FOREIGN PATENT DOCUMENTS

| JP | 2008-109354 A | 5/2008 |
| JP | 2008-243149 A | 10/2008 |

* cited by examiner

FIG.2

CHARACTER INPUT DEVICE, CHARACTER INPUT METHOD, AND CHARACTER INPUT PROGRAM

CROSS-REFERENCE TO RELATED APPLICATION

This application is a National Stage of PCT international application Ser. No. PCT/JP2011/069315 filed on Aug. 26, 2011 which designates the United States, and which is based upon and claims the benefit of priority from Japanese Patent Application No. 2010-191545, filed on Aug. 27, 2010.

FIELD

The present disclosure relates to a character input device, a character input method, and a character input program.

BACKGROUND

In recent years, touch panels have been widely used in order to allow a user to perform an intuitive operation and achieve a small character input device which does not include a device requiring a large physical area, such as a keyboard. As a technique for inputting characters using a touch panel, a technique has been known in which a character is handwritten to the touch panel (for example, Patent Literature 1).

When a character is handwritten, recognition accuracy increases as the range of the characters to be recognized is narrowed. Patent Literature 2 discloses a technique in which the user operates, for example, a button for changing the mode to change the characters to be recognized to the characters of desired means.

CITATION LIST

Patent Literature

Patent Literature 1: JP 2003-141448 A
Patent Literature 2: JP 2001-202191 A

Technical Problem

However, when the user operates, for example, the button for changing the mode to change the characters to be recognized to the characters of desired means as in the related art, recognition accuracy is improved, but determination and operations to be performed by the user increase, which results in an increase in the burden of the user.

For the foregoing reasons, there is a need for a character input device, a character input method, and a character input program capable of suppressing an increase in the burden of the user.

SUMMARY

According to an aspect, a character input device includes: a display unit; a touch sensor for detecting a contact with a surface thereof; a character recognition processing unit for performing a first character recognition process for recognizing a character used for a first function and a second character recognition process for recognizing a character used for a second function, on the basis of a locus connecting positions where the contact is detected by the touch sensor; and an input control unit for displaying, on the display unit, a first input screen for the first function onto which the character recognized by the first character recognition process is input and/or a second input screen for the second function onto which the character recognized by the second character recognition process is input.

According to another aspect, a character input device includes: a display unit; a touch sensor for detecting a contact with a surface thereof; a character recognition processing unit for recognizing a character on the basis of a locus connecting positions where the contact is detected by the touch sensor; and an input control unit configured to display a screen for a first function to which the character recognized by the character recognition processing unit is input on the display unit when the character is used for the first function, and display a screen for a second function to which the character recognized by the character recognition processing unit is input on the display unit when the character is used for the second function.

According to another aspect, a character input method is performed by a character input device including a display unit and a touch sensor for detecting a contact with a surface thereof. The character input method includes: performing a first character recognition process for recognizing a character used for a first function on the basis of a locus connecting positions where the contact is detected by the touch sensor; performing a second character recognition process for recognizing a character used for a second function on the basis of the locus; and displaying, on the display unit, a first input screen for the first function to which the character recognized by the first character recognition process is input and/or a second input screen for the second function to which the character recognized by the second character recognition process is input.

According to another aspect, a character input program causes a character input device including a display unit and a touch sensor for detecting a contact with a surface thereof to execute: performing a first character recognition process for recognizing a character used for a first function on the basis of a locus connecting positions where the contact is detected by the touch sensor; performing a second character recognition process for recognizing a character used for a second function on the basis of the locus; and displaying, on the display unit, a first input screen for the first function to which the character recognized by the first character recognition process is input and/or a second input screen for the second function to which the character recognized by the second character recognition process is input.

Advantageous Effects of Invention

The advantages of one embodiment of the invention are that an increase in the burden of the user can be suppressed.

BRIEF DESCRIPTION OF DRAWINGS

FIG. 2 is a diagram illustrating details of a keyboard illustrated in FIG. 1.

DESCRIPTION OF EMBODIMENTS

Hereinafter, a character input device, a character input method, and a character input program according to embodiments of the invention will be described in detail with reference to the accompanying drawings. The invention is not limited to the embodiments. The components which will be described below include components which can be easily considered by those skilled in the art, components which are substantially the same as the following components, and equivalents thereof. In the following description, a mobile phone is given as an example of the character input device. However, the device to which the invention can be applied is not limited to the mobile phones, but the invention can be applied to various devices including a touch panel, such as smart phones, PHSs (Personal Handyphone Systems), PDAs, portable navigation devices, personal computers, and game machines.

EMBODIMENTS

Figure 1:
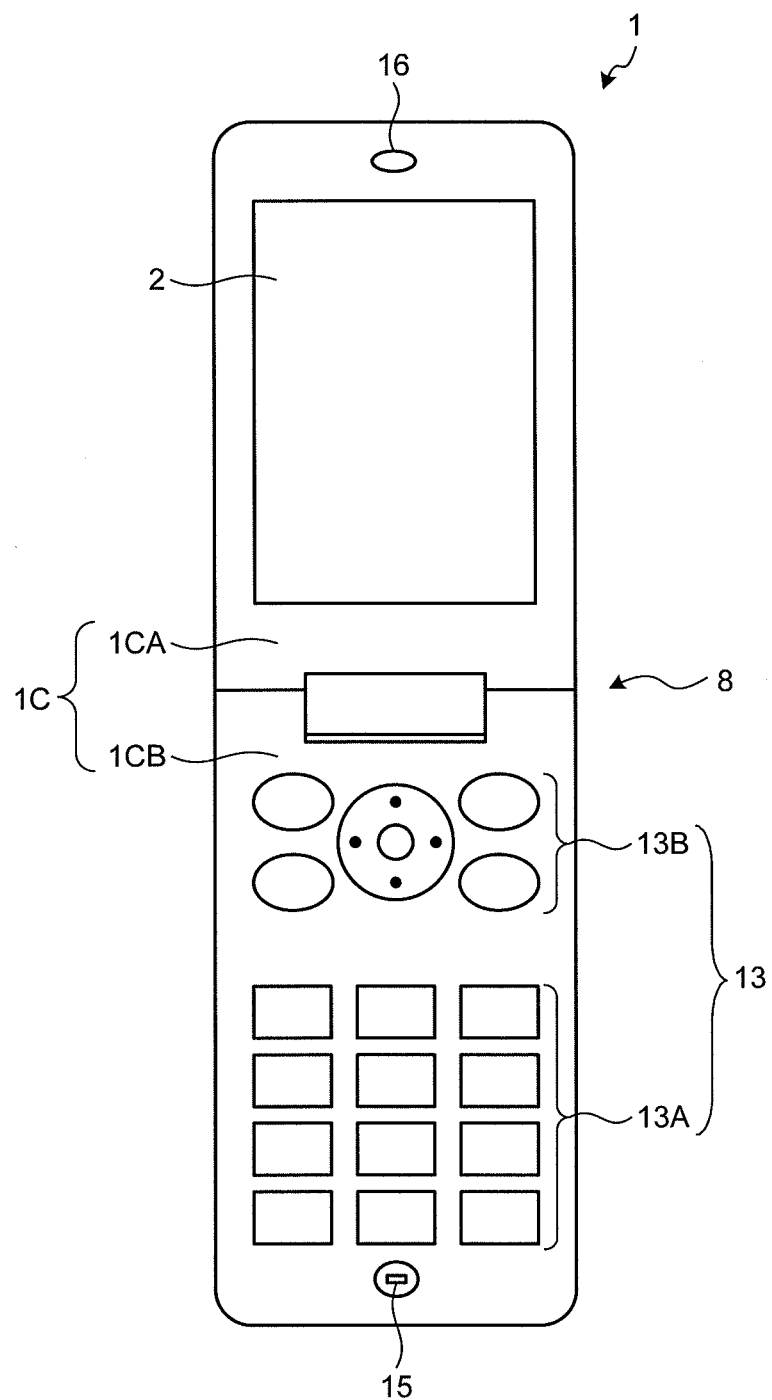
FIG. 1 is a front view illustrating an appearance of a mobile phone.

First of all, an appearance of a mobile phone 1, which is an embodiment of the character input device according to the invention, will be described with reference to FIGS. 1 and 2. FIG. 1 is a front view illustrating the appearance of the mobile phone 1. The mobile phone 1 includes a housing 1C including a plurality of housings. Specifically, the housing 1C has a structure in which a first housing 1CA and a second housing 1CB can be opened or closed. That is, the mobile phone 1 includes a folding housing.

The housing of the mobile phone 1 is not limited to the structure. For example, the housing of the mobile phone 1 may be a straight type in which the first housing 1CA and the second housing 1CB are integrally formed. The housing of the mobile phone 1 may be a slide type in which one housing and the other housing can slide relative to each other, with two housings overlapping each other. The housing of the mobile phone 1 may be a rotary type in which one housing is rotated about an axis line along the overlap direction. Alternatively, the housing of the mobile phone 1 may have a structure in which two housings are connected to each other through a two-axis hinge.

The first housing 1CA and the second housing 1CB are connected to each other by a hinge mechanism 8 which is a connection portion. Since the first housing 1CA and the second housing 1CB are connected to each other by the hinge mechanism 8, the first housing 1CA and the second housing 1CB can be rotated about the hinge mechanism 8 relative to each other.

The first housing 1CA includes a touch panel 2 that functions as a display means and an input means. The touch panel 2 displays, for example, characters, figures, and images. The touch panel 2 detects various kinds of operations which are performed for the touch panel 2 using, for example, a finger, a stylus, and a pen (hereinafter, simply referred to as a "finger"). The first housing 1CA also includes a receiver 16 which is an output means for outputting a sound during a phone call using the mobile phone 1.

The second housing 1CB includes an input unit 13 that receives various inputs. The input unit 13 includes a keyboard 13A that receives the input of numbers or characters and function keys 13B that are used to call various kinds of functions of the mobile phone 1 or to move a cursor. In addition, the second housing 1CB includes a microphone 15 which is a sound acquiring means for acquiring a sound during a phone call using the mobile phone 1.

Figure 2:
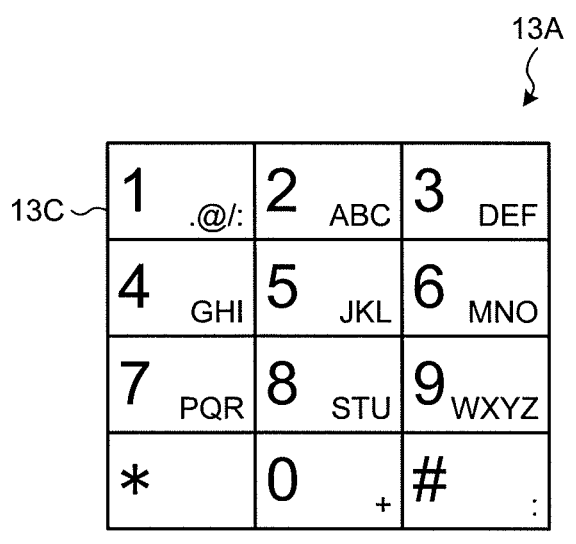

FIG. 2 is a diagram illustrating details of the keyboard 13A illustrated in FIG. 1. As illustrated in FIG. 2, the keyboard 13A includes 12 keys which are arranged in a so-called numerical keypad array. The keyboard 13A includes a plurality of modes. When the mode of the keyboard 13A is changed, characters which are input by the operation of the keyboard 13A are changed. The keyboard 13A is changed between a number mode for inputting numbers forming, for example, a telephone number and an alphabet mode for inputting alphabets or symbols.

When the keyboard 13A is changed to the number mode and a key 13C which is arranged on the upper left side of the keyboard 13A is pressed, the key 13C receives number "1" as an input character. When the keyboard 13A is changed to the alphabet mode and the key 13C is pressed, the key 13C receives any one of symbols ". (period)," "@ (at mark)," "/(slash)," and ": (colon)" as the input character according to the pressed number of times of the key 13C.

The number and arrangement of keys of the keyboard 13A illustrated in FIG. 2 are illustrative examples, and they are not necessarily limited to the number and arrangement illustrated in FIG. 2. The modes of the keyboard 13A are not necessarily limited to the above, and the keyboard 13A may have any mode for purposes.

Then, the input of characters using the touch panel 2 illustrated in FIG. 1 will be described. The mobile phone 1 receives a character which is input by a handwriting method through the touch panel 2. The handwriting method compares a locus connecting the positions where the contact of the finger which is moved while touching the touch panel 2 is detected with the forms of the characters to recognize the input character. In order to receive the input of the character by the handwriting method, the mobile phone 1 performs two types of character recognition processes.

The first character recognition process is performed in order to receive the input of a telephone number. The first character recognition process recognizes numbers 0 to 9 and a symbol, such as "# (sharp)," which is used to input the telephone number. The second character recognition process is performed in order to receive the input of almost all of the characters treated by the mobile phone 1. The characters recognized by the second character recognition process include the characters recognized by the first character recognition process.

In comparison between the first character recognition process and the second character recognition process, the first character recognition process can recognize the smaller number of characters, but has the higher recognition accuracy of characters to be recognized, such as numbers. On the other hand, the second character recognition process can recognize a larger number of characters. However, when the characters to be recognized are limited to numbers or so which can be recognized by the first character recognition process, the recognition accuracy of the second character recognition process is lower than that of the first character recognition process. For example, when number "0 (zero)" is input, the first character recognition process correctly recognizes the character, but the second character recognition process is likely to recognize the number as a letter "0 (alphabet)" which is similar to zero.

The two character recognition processes are used according to the situation. For example, in a situation in which the input of a telephone number is received, the mobile phone 1 recognizes the input character using the first character recognition process. In the other situations, the mobile phone 1 recognizes the input character using the second character recognition process.

However, in some cases, character input starts in a situation in which it is difficult to determine whether the user is about to inputting a telephone number or other information. In this case, the mobile phone 1 performs the first character recognition process and the second character recognition process and determines the type of character to be input by the user, on the basis of the accuracy of correctly recognizing the character using each character input process.

Figure 3:
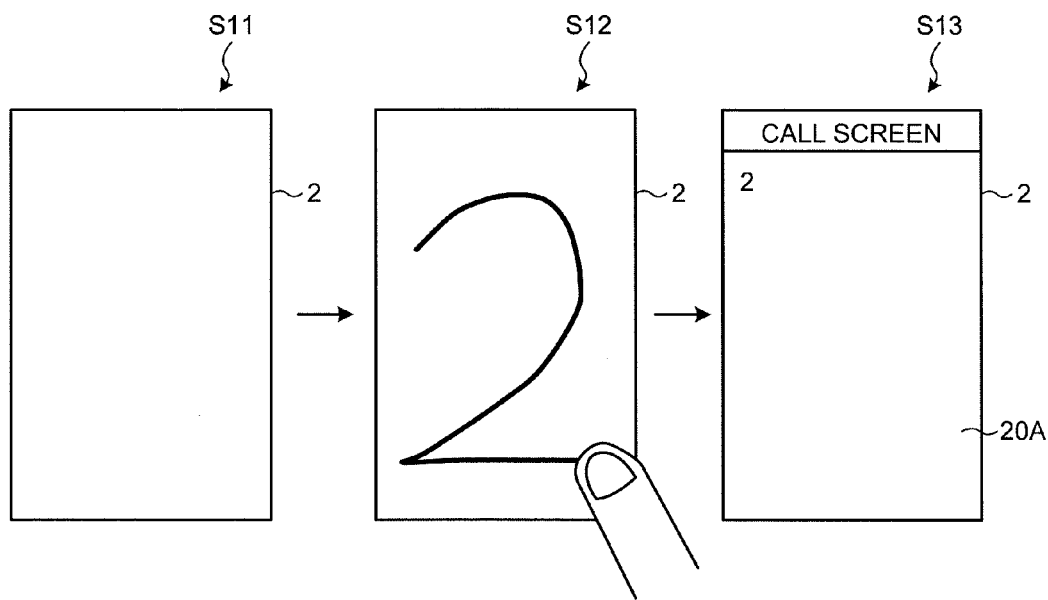
FIG. 3 is a diagram illustrating the operation of the mobile phone when a number is handwritten to an idle screen.

A detailed example will be described with reference to FIGS. 3 to 6. FIG. 3 is a diagram illustrating the operation of the mobile phone 1 when a number is handwritten to an idle screen. At Step S11 illustrated in FIG. 3, the idle screen is displayed on the touch panel 2.

The idle screen means a screen when the mobile phone waits for the sending or receiving of a phone call or a screen when the mobile phone waits for the start of an application program. In other words, the idle screen is a screen before the screen is changed to various function screens provided by the mobile phone 1. The idle screen is also called, for example, a desktop screen, a home screen, or wallpaper. In the example illustrated in FIG. 3, a solid color screen is displayed as the idle screen. However, image data or animation data may be displayed as the idle screen. Also, a portion which is dynamically changed, such as a calendar or a clock, may be included as a portion of the idle screen.

At Step S12, the user handwrites number "2" on the idle screen displayed on the touch panel 2. The idle screen is not a screen for receiving the input of a specific character, and in this stage it is uncertain whether the user is about to input a telephone number or other information. Therefore, the mobile phone 1 performs the first character recognition process and the second character recognition process to recognize the input character.

In this case, the first character recognition process and the second character recognition process recognize "2" as the input character with the same level of accuracy. It is considered that, among the characters which can be recognized by the mobile phone 1, when a character which can be recognized by the first character recognition process which recognizes a smaller number of characters is input, the user is likely to input a telephone number. Therefore, at Step S13, the mobile phone 1 displays an outgoing call number input screen 20A, which is an input screen for inputting a telephone number, on the touch panel 2 and outputs "2" which has been recognized by the first character recognition process as the input character to the outgoing call number input screen 20A.

The outgoing call number input screen 20A is used to send a phone call using the input telephone number or to register the input telephone number to address book data.

Figure 4:
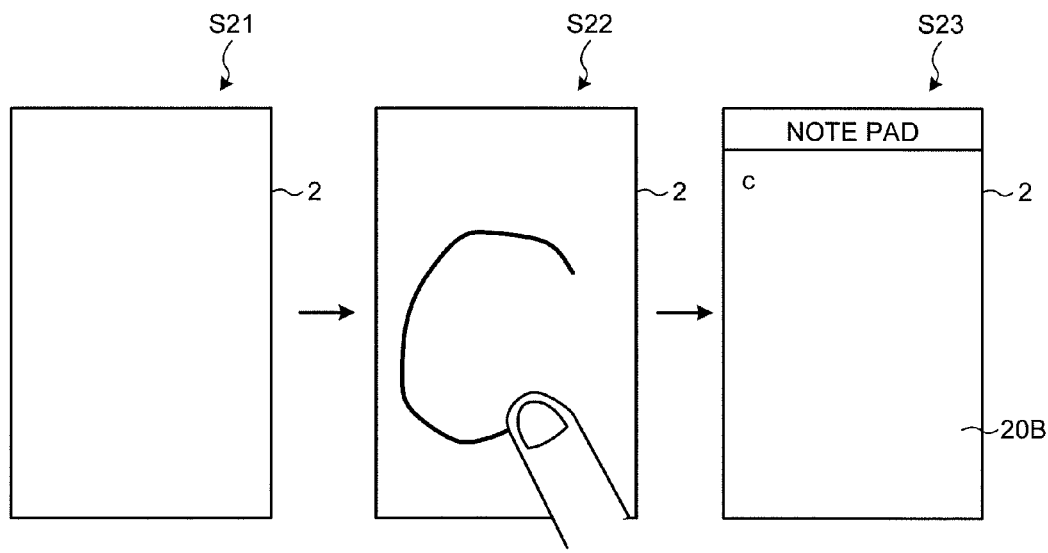
FIG. 4 is a diagram illustrating the operation of the mobile phone when an alphabet is handwritten to the idle screen.

FIG. 4 is a diagram illustrating the operation of the mobile phone 1 when an alphabet is handwritten to the idle screen. At Step S21 illustrated in FIG. 4, the idle screen is displayed on the touch panel 2.

At Step S22, the user handwrites alphabet "c" to the idle screen displayed on the touch panel 2. The idle screen is not a screen which receives the input of a specific character, and in this stage it is unclear whether the user is about to input a telephone number or other information. Therefore, the mobile phone 1 performs the first character recognition process and the second character recognition process to recognize the input character.

In this case, the second character recognition process recognizes "c" as the input character with high accuracy. On the other hand, although the first character recognition process recognizes, for example, "0" which is relatively close to "c" among the characters used to input the telephone number, the recognition accuracy thereof is very low. In this embodiment, it is assumed that, when a character cannot be recognized by the character recognition process, any one of characters is recognized with an accuracy of 0.

As such, it is considered that, when the recognition accuracy of the character by the first character recognition process is low, the user is likely to input information other than a telephone number. At Step S23, the mobile phone 1 displays a note pad screen 20B, which is an input screen capable of inputting arbitrary characters, on the touch panel 2 and outputs the recognized "c" as the input character to the note pad screen 20B.

The note pad screen 20B is used to store the input character in the mobile phone 1 or a server which can be accessed by the mobile phone 1 by wireless communication so as to be readable or to display the input character on the idle screen so as to be easily removed, like Post-it. A screen to be displayed on the touch panel 2 at Step S23 limited to the note pad screen 20B, but may be any screen, such as an e-mail text input screen or the like, as long as it can receive the input of an arbitrary character.

Figure 5:
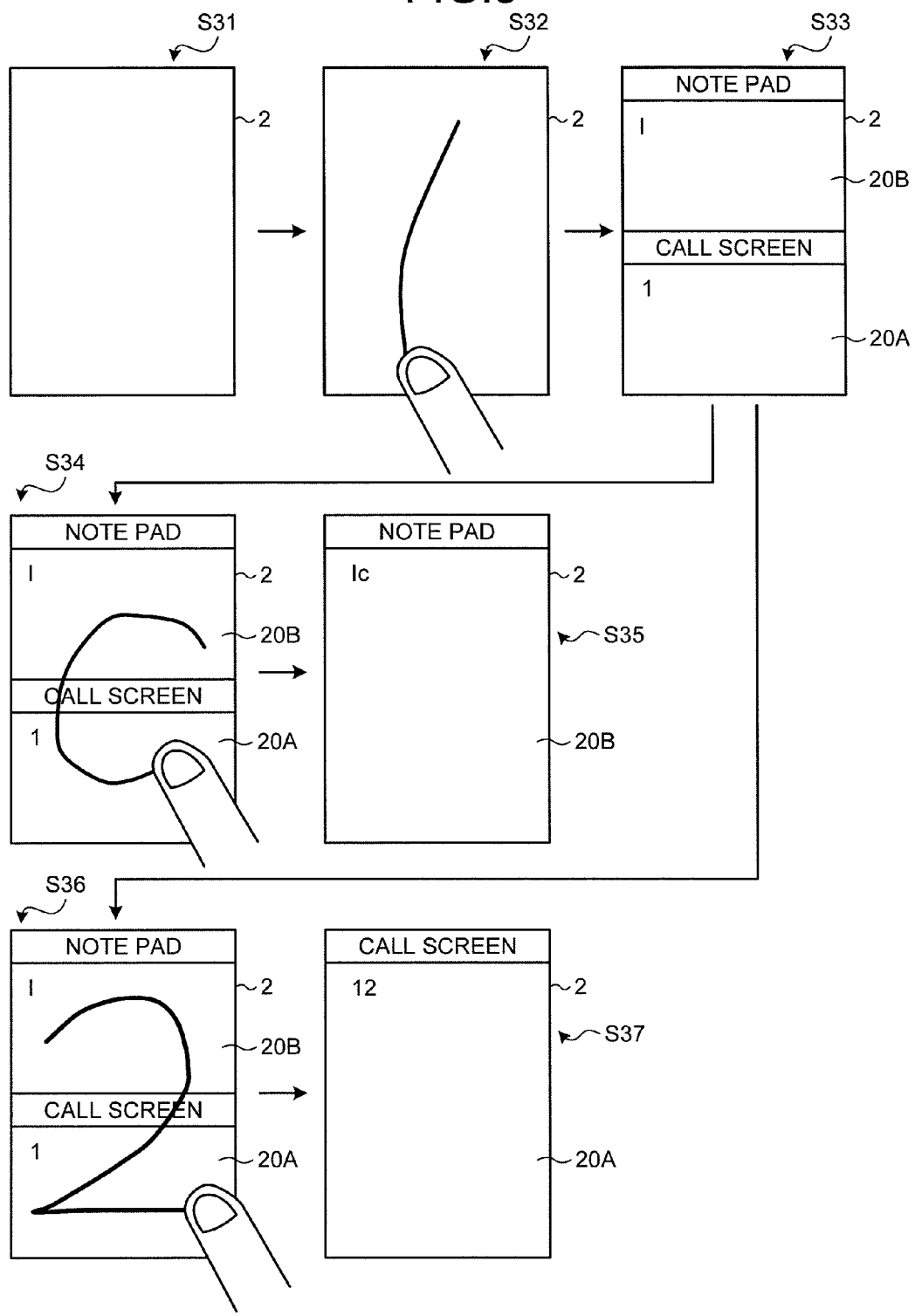
FIG. 5 is a diagram illustrating the operation of the mobile phone when it is difficult to determine whether the character which is handwritten to the idle screen is a number or an alphabet.

FIG. 5 is a diagram illustrating the operation of the mobile phone 1 when it is difficult to determine whether the character input to the idle screen is a number or alphabet. At Step S31 illustrated in FIG. 5, the idle screen is displayed on the touch panel 2.

At Step S32, the user handwrites a vertically long line to the idle screen displayed on the touch panel 2. The idle screen is not a screen for receiving the input of a specific character, and in this stage it is unclear whether the user is about to input a telephone number or other information. Therefore, the mobile phone 1 performs the first character recognition process and the second character recognition process to recognize the input character.

In this case, it is assumed that the first character recognition process recognizes number "1" as the input character with a medium level of accuracy. On the other hand, it is assumed that the second character recognition process recognizes alphabet "I" as the input character with a medium level of accuracy. As such, when the accuracy of the character recognized by the first character recognition process is at a medium level, it is uncertain whether the user is about to input a telephone number or other information.

At Step S33, the mobile phone 1 displays both the outgoing call number input screen 20A, which is an input screen for inputting a telephone number, and the note pad screen 20B, which is an input screen capable of inputting arbitrary characters, on the touch panel 2. Then, the mobile phone 1 outputs "1" recognized by the first character recognition process as the input character to the outgoing call number input screen 20A and outputs "I" recognized by the second character recognition process as the input character to the note pad screen 20B.

Then, the mobile phone 1 performs the first character recognition process and the second character recognition process to recognize the input character. For example, after Step S33, it is assumed that the user handwrites alphabet "c" while the outgoing call number input screen 20A and the note pad screen 20B are displayed, at Step S34. In this case, the second character recognition process recognizes "c" as the input character with high accuracy, but the first character recognition process recognizes a character with very low accuracy.

As a result, at Step S35, the mobile phone 1 removes the outgoing call number input screen 20A and displays only the note pad screen 20B on the touch panel 2. Then, the mobile phone 1 adds alphabet "c" recognized by the second character recognition process to the note pad screen 20B.

After Step S33, it is assumed that the user handwrites number "2" while the outgoing call number input screen 20A and the note pad screen 20B are displayed, at Step S36. In this case, the first character recognition process and the second character recognition process recognize "2" as the input character with the same high accuracy.

As a result, at Step S37, the mobile phone 1 removes the note pad screen 20B and displays only the outgoing call number input screen 20A on the touch panel 2. Then, the mobile phone 1 adds "2" recognized by the first character recognition process to the outgoing call number input screen 20A.

Figure 6:
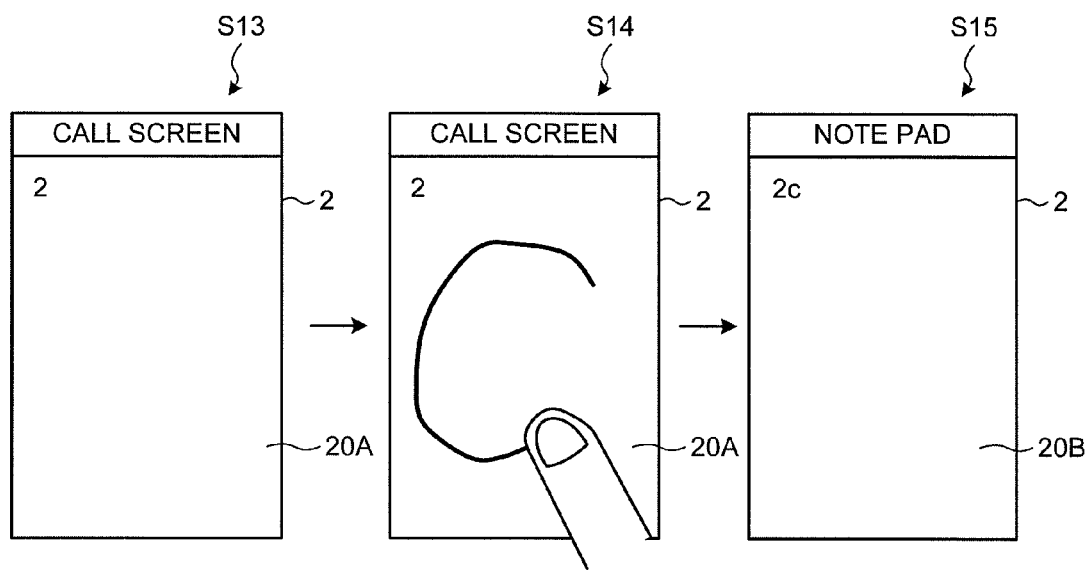
FIG. 6 is a diagram illustrating the operation of the mobile phone when a number is handwritten and then an alphabet is handwritten.

Even after displaying either one of the outgoing call number input screen 20A and the note pad screen 20B on the touch panel 2, the mobile phone 1 performs the first character recognition process and the second character recognition process. FIG. 6 is a diagram illustrating the operation of the mobile phone 1 when an alphabet is handwritten after a number is handwritten.

It is assumed that the outgoing call number input screen 20A, which is an input screen for inputting a telephone number, is displayed on the touch panel 2 and "2" recognized by the first character recognition process is output as the input character to the outgoing call number input screen 20A at Step S13 illustrated in FIG. 3, and then the user handwrites alphabet "c" at Step S14.

In this case, the second character recognition process recognizes "c" as the input character with high accuracy, but the first character recognition process recognizes a character with very low accuracy. As a result, at Step S15, the mobile phone 1 removes the outgoing call number input screen 20A and displays only the note pad screen 20B on the touch panel 2. Then, the mobile phone 1 outputs "2" recognized by the second character recognition process at Step S12 and "c" newly recognized by the second character recognition process to the note pad screen 20B.

FIG. 6 illustrates an example in which, when an alphabet is input while the outgoing call number input screen 20A is displayed, the note pad screen 20B is displayed instead of the outgoing call number input screen 20A. However, similarly, when a number is input while the note pad screen 20B is displayed, the outgoing call number input screen 20A may be displayed, instead of the note pad screen 20B.

After recognizing a predetermined number of characters, the mobile phone 1 performs only one of the first character recognition process and the second character recognition process on the basis of the accuracy of the character recognized at that time. For example, when the predetermined number of characters is three and three input characters are successively recognized by the first character recognition process with high accuracy, the mobile phone 1 displays the outgoing call number input screen 20A on the touch panel 2 and then recognizes the input character using only the first character recognition process.

When the number of input characters is equal to or greater than a predetermined value, it is possible to substantially clearly determine whether the user is about to input a telephone number or other information, on the basis of the accuracy of the recognition result of the first character recognition process and the second character recognition process up to that time. Therefore, thereafter, only the character recognition process corresponding to the information to be input by the user can be performed to improve the recognition accuracy of characters. In addition, since a relatively large load is applied to the character recognition process, it is possible to improve responsiveness to the operation of the user and reduce power consumption by narrowing the range of the character recognition process to be performed.

As described above, even in a case where the kind of information to be input by the user is unclear, the mobile phone 1 can perform the character recognition process corresponding to the information to be input by the user.

Figure 7:
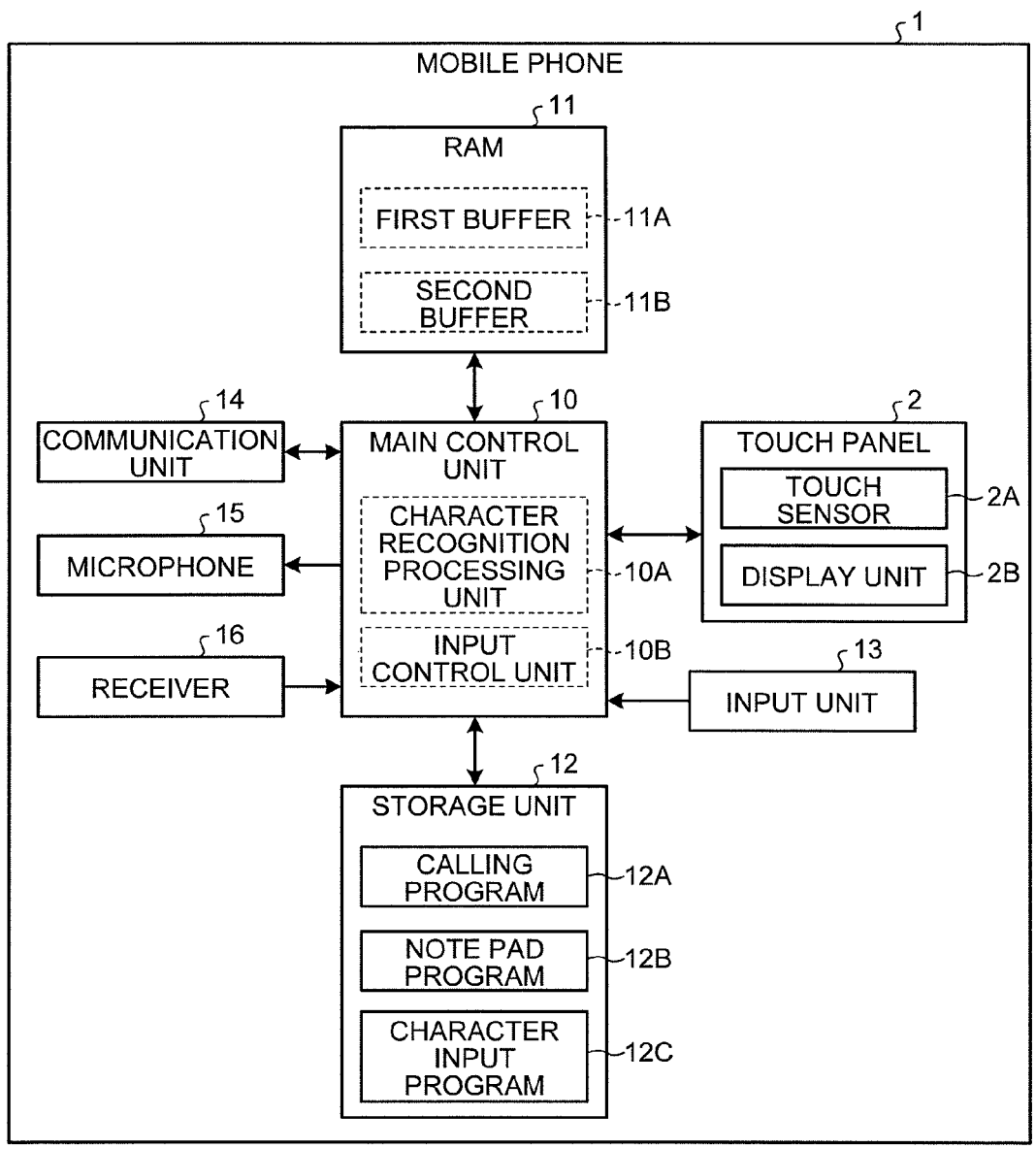
FIG. 7 is a block diagram illustrating the functional structure of the mobile phone.

Then, the functional structure of the mobile phone 1 will be described. FIG. 7 is a block diagram illustrating the functional structure of the mobile phone 1. As illustrated in FIG. 7, the mobile phone 1 includes the touch panel 2, a main control unit 10, a RAM (Random Access Memory) 11, a storage unit 12, the input unit 13, a communication unit 14, the microphone 15, and the receiver 16.

The touch panel 2 includes a display unit 2B and a touch sensor 2A which overlaps the display unit 2B. The touch sensor 2A detects various operations which are performed for the touch panel 2 with the finger and the positions on the touch panel 2 where the operations are performed. The operations detected by the touch sensor 2A include an operation of contacting the surface of the touch panel 2 with the finger, an operation of moving the finger while contacting the surface of the touch panel 2 with the finger, and an operation of taking off the finger from the surface of the touch panel 2. The touch sensor 2A may employ a detection method of a pressure-sensitive type, a capacitive type, or the like. The display unit 2B is, for example, a liquid crystal display (LCD) or an organic EL (Organic Electro-Luminescence) panel and displays, for example, characters, figures, and images.

The main control unit 10 is, for example, a CPU (Central Processing Unit) and controls integrally the operation of the mobile phone 1. Specifically, the main control unit 10 executes a program stored in the storage unit 12 to control, for example, the touch panel 2 and the communication unit 14, while referring to data stored in the storage unit 12 as required, thereby performing various processes. The main control unit 10 loads the program stored in the storage unit 12 and/or the acquired/generated/processed data obtained by the execution of processes to the RAM 11 which provides a temporary memory area, as required. The program executed by the main control unit 10 or the data referred to by the main control unit 10 may be downloaded from the server by wireless communication using the communication unit 14.

For example, the main control unit 10 executes a character input program 12C stored in the storage unit 12 to implement a character recognition processing unit 10A and an input control unit 10B. The character recognition processing unit 10A performs the first character recognition process and the second character recognition process. The input control unit 10B controls the character recognition process of the character recognition processing unit 10A and the mode changing operation of the keyboard 13A. The input control unit 10B displays the input screen on the touch panel 2 according to the situation. The functions of the character recognition processing unit 10A and the input control unit 10B will be described in detail below.

The RAM 11 temporarily stores data which is used in the process performed by the main control unit 10. For example, the RAM 11 includes first and second buffers 11A and 11B, which are areas for storing the result of the character recognition process by the character recognition processing unit 10A. The first buffer 11A is an area which stores the character recognition result of the first character recognition process and the second buffer 11B is an area which stores the character recognition result of the second character recognition process.

Figure 8:
FIG. 8 is a diagram illustrating an example of a first buffer.

FIG. 8 illustrates an example of the first buffer 11A. As illustrated in FIG. 8, the first buffer 11A stores the characters recognized by the first character recognition process and the accuracy of correctly recognizing the characters in time series so as to be associated with each other. An example in FIG. 8 illustrates the first buffer 11A at Step S35 illustrated in FIG. 5, in which "1" is stored as the first recognized character so as to be associated with an accuracy of "80%" and "0" is stored as the second recognized character so as to be associated with an accuracy of "10%".

Figure 9:
FIG. 9 is a diagram illustrating an example of a second buffer.

FIG. 9 illustrates an example of the second buffer 11B. As illustrated in FIG. 9, the second buffer 11B stores the characters recognized by the second character recognition process and the accuracy of correctly recognizing the characters in time series so as to be associated with each other. An example in FIG. 9 illustrates the second buffer 11B at Step S35 illustrated in FIG. 5, in which, "I" is stored as the first recognized character so as to be associated with an accuracy of "80%" and "c" is stored as the second recognized character so as to be associated with an accuracy of "90%".

The first buffer 11A and the second buffer 11B also store the characters which are input from the keyboard 13A to the input screen displayed on the touch panel 2. However, for example, when an input screen which does not receive the input of an alphabet, such as the outgoing call number input screen 20A, is displayed on the touch panel 2 and the keyboard 13A is changed to the alphabet mode, the character input from the keyboard 13A is rejected by the input screen, and is not stored in the first buffer 11A and the second buffer 11B.

The storage unit 12 is, for example, a non-volatile memory or a magnetic storage device, and stores the program or data which is used in the process performed by the main control unit 10. Specifically, the storage unit 12 stores a calling program 12A for making a phone call, a note pad program 12B for displaying/editing/storing/removing note pad data, and a character input program 12C for receiving the input of characters by the above-described handwriting method. The outgoing call number input screen 20A illustrated in FIG. 3 is a screen displayed by the main control unit 10 on the basis of the functions provided by the calling program 12A. The note pad screen 20B illustrated in FIG. 4 is a screen displayed by the main control unit 10 on the basis of the functions provided by the note pad program 12B.

The storage unit 12 also stores an operating system program which implements the basic functions of the mobile phone 1, and other programs or data, such as address book data in which, for example, names, telephone numbers, and mail addresses are registered.

The input unit 13 receives the operations of the user through the keyboard 13A and the function key 13B, and transmits signals corresponding to the received operations to the main control unit 10. The communication unit 14 establishes a wireless signal path with a base station through the channel allocated by the base station using a CDMA system or the like, and performs telephone communication and information communication with the base station. The microphone 15 converts, for example, the voice of the user into electric signals. The receiver 16 outputs, for example, the voice of the communication partner or a ringtone in the telephone communication.

Figure 10:
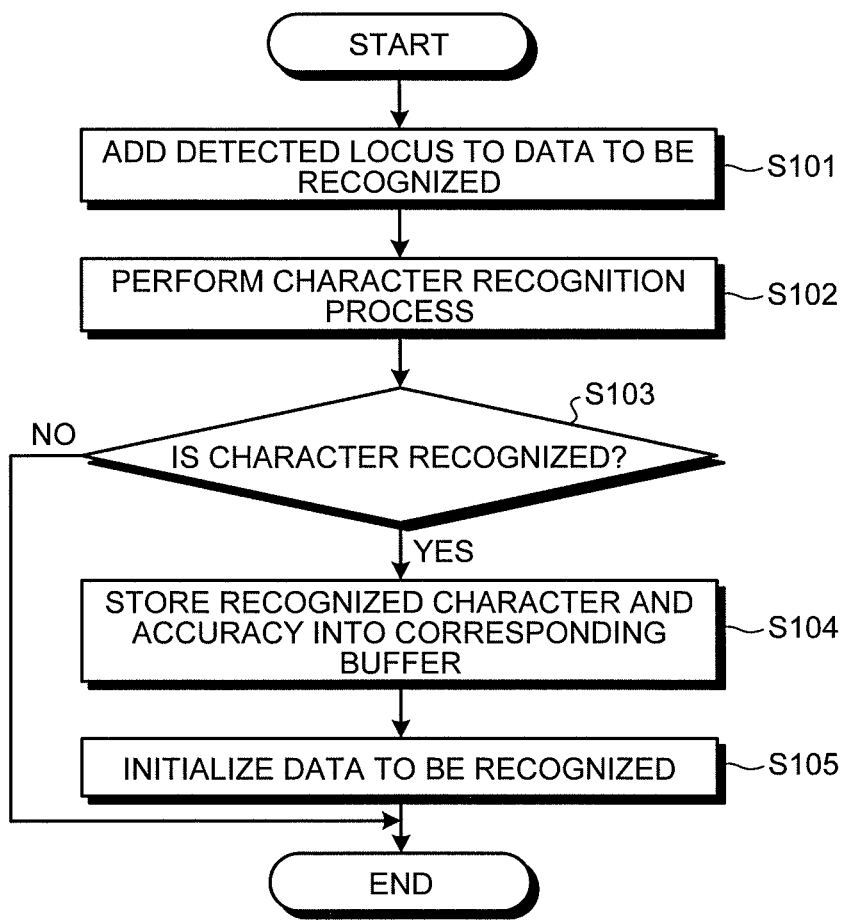
FIG. 10 is a flowchart illustrating the procedure of a character recognition process of a character recognition processing unit.

Next, the procedure of the process performed by the character recognition processing unit 10A and the input control unit 10B which are implemented by the main control unit 10 will be described. FIG. 10 is a flowchart illustrating the procedure of the character recognition process of the character recognition processing unit 10A. The character recognition processing unit 10A performs the procedure illustrated in FIG. 10 under the control of the input control unit 10B whenever a new contact for handwriting a character is detected in the touch panel 2.

The procedure illustrated in FIG. 10 is a procedure for performing either one of the first character recognition process and the second character recognition process. When the first character recognition process and the second character recognition process are performed, the character recognition processing unit 10A performs the procedure illustrated in FIG. 10 for each character recognition process.

As illustrated in FIG. 10, first of all, at Step S101, the character recognition processing unit 10A adds the locus, which is drawn on the touch panel 2 by the newly detected contact, to data to be recognized. In the data to be recognized, the locus is sequentially stored as a stroke forming the character. The data to be recognized is stored in the RAM 11. The character recognition processing unit 10A performs the character recognition process on the basis of the data to be recognized, at Step S102.

When some character is recognized (Yes at Step S103), the character recognition processing unit 10A stores the recognized character and the accuracy of correctly recognizing the character into a buffer (the first buffer 11A or the second buffer 11B) corresponding to the performed character recognition process, at Step S104. Then, at Step S105, the character recognition processing unit 10A initializes the data to be recognized and ends the character recognition process.

On the other hand, when no character is recognized, that is, when a character is being input (No at Step S103), the character recognition processing unit 10A ends the character recognition process, without adding a process to the corresponding buffer.

In the procedure illustrated in FIG. 10, the character recognition process is performed whenever a new locus is detected. However, the character recognition process may be performed at the time when the user performs a predetermined operation to instruct the execution of the character recognition process or when a predetermined time has elapsed from storing the locus of the first stroke in the data to be recognized. The term "predetermined operation" means, for example, an operation of tapping an area in which "character recognition" is displayed on the touch panel, and the term "predetermined time" means sufficient time to input the strokes of one character.

Figure 11:
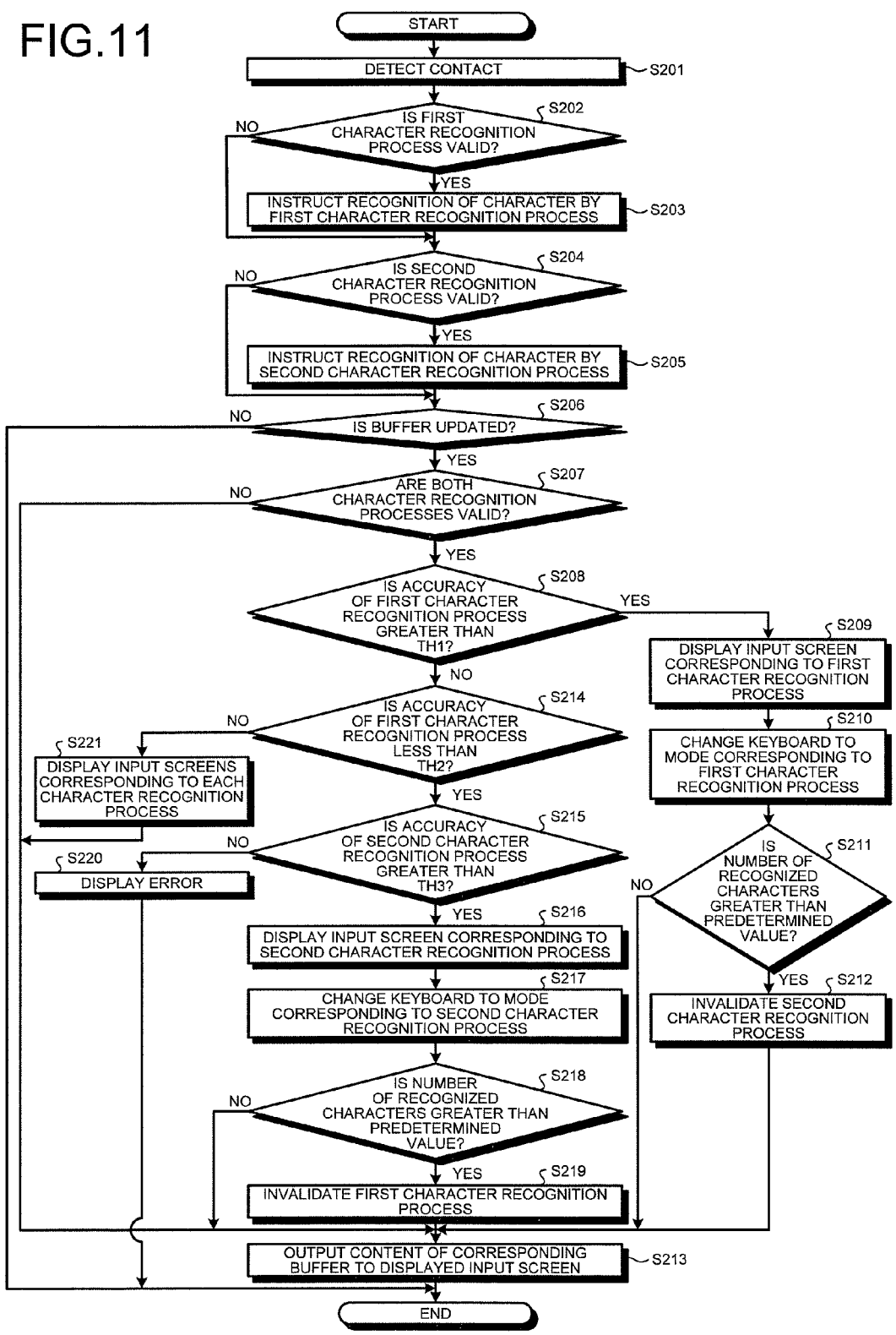
FIG. 11 is a flowchart illustrating the procedure of an input control process of the input control unit.

FIG. 11 is a flowchart illustrating the procedure of the input control process performed by the input control unit 10B when the kind of information to be input by the user is unclear. The input control unit 10B performs the procedure illustrated in FIG. 11 whenever a new contact for handwriting a character is detected in the touch panel 2.

When the kind of information to be input by the user is unclear, the first character recognition process and the second character recognition process are validated in advance. The term "validating" means that the process is set to be performed. On the other hand, the term "invalidating" means that the process is set to be stopped.

As illustrated in FIG. 11, when a new contact is detected in the touch panel 2 at Step S201, the input control unit 10B determines whether the first character recognition process is valid at Step S202. When the first character recognition process is valid (Yes at Step S202), the input control unit 10B instructs the character recognition processing unit 10A to recognize a character using the first character recognition process at Step S203. In response to the instruction, the character recognition processing unit 10A performs the character recognition process illustrated in FIG. 10 in order to recognize a character using the first character recognition process. When the first character recognition process is invalid (No at Step S202), the input control unit 10B does not instruct the recognition of a character by the first character recognition process.

Then, at Step S204, the input control unit 10B determines whether the second character recognition process is valid. When the second character recognition process is valid (Yes at Step S204), the input control unit 10B instructs the character recognition processing unit 10A to recognize a character using the second character recognition process at Step S205. In response to the instruction, the character recognition processing unit 10A performs the character recognition process illustrated in FIG. 10 in order to recognize a character using the second character recognition process. When the second character recognition process is invalid (No at Step S204), the input control unit 10B does not instruct the recognition of a character by the second character recognition process.

Then, at Step S206, the input control unit 10B determines whether at least one of the first buffer 11A and the second buffer 11B is updated along with the execution of the character recognition process. The update of at least one of the first buffer 11A and the second buffer 11B means that a new character is recognized. When neither the first buffer 11A nor the second buffer 11B is updated (No at Step S206), the input control unit 10B ends the input control process.

When at least one of the first buffer 11A and the second buffer 11B is updated (Yes at Step S206), the input control unit 10B determines whether both the first character recognition process and the second character recognition process are valid at Step S207. The fact that both the first character recognition process and the second character recognition process are valid means that the kind of information to be input by the user is still unclear.

When the first character recognition process or the second character recognition process is invalid, that is, when the kind of information to be input by the user is determined and the character recognition process and the input screen corresponding to the kind of information to be input by the user is selected (No at Step S207), the input control unit 10B outputs the content of the first buffer 11A or the second buffer 11B corresponding to the input screen displayed on the touch panel 2 to the input screen and ends the input control process at Step S213.

On the other hand, when both the first character recognition process and the second character recognition process are valid (Yes at Step S207), the input control unit 10B tries to determine the kind of information to be input by the user, as follows.

First, at Step S208, the input control unit 10B determines whether the accuracy of the first character recognition process is greater than a first threshold value TH1. The threshold value TH1 is used to determine whether the accuracy is sufficiently high. It is preferable that the accuracy of the character recognition process be the representative value (for example, the average value or the minimum value) of the accuracy which is associated with each character stored in the corresponding buffer. It is preferable that the character input from the keyboard 13A be not reflected in the evaluation of accuracy.

When the accuracy of the first character recognition process is greater than the first threshold value TH1, that is, when the accuracy of the first character recognition process is sufficiently high (Yes at Step S208), the input control unit 10B displays the input screen (for example, the outgoing call number input screen 20A) corresponding to the first character recognition process on the touch panel 2 at Step S209.

At Step S210, the input control unit 10B changes the keyboard 13A to the mode corresponding to the first character recognition process. Since the first character recognition process is a character recognition process that mainly recognizes a number, the mode corresponding to the first character recognition process is the number mode. As such, when the mode of the keyboard 13A is changed, the user can input an appropriate character to the input screen displayed at Step S209 using the keyboard 13A, without performing a special operation for changing the mode of the keyboard 13A.

In general, any one of the function keys 13B is pressed to change the mode of the keyboard 13A. However, in many cases, different functions are allocated to the function keys 13B according to the situation and the change in the mode of the keyboard by the operation of the function keys 13B is not intuitive. In contrast, as described above, the operation of changing the mode of the keyboard 13A according to the result of handwriting input is natural to the user and provides high usability to the user.

Then, at Step S211, the input control unit 10B determines whether the number of recognized characters is greater than a predetermined value. The number of recognized characters means the number of characters stored in the first buffer 11A which is a buffer corresponding to the first character recognition process. When the number of recognized characters is greater than the predetermined value (Yes at Step S211), the input control unit 10B invalidates the second character recognition process at Step S212. When the number of recognized characters is not greater than the predetermined value (No at Step S211), the input control unit 10B maintains the second character recognition process to be valid.

Then, at Step S213, the input control unit 10B outputs the content of the first buffer 11A or the second buffer 11B which corresponds to the input screen displayed on the touch panel 2 to the input screen and ends the input control process.

When the accuracy of the first character recognition process is less than the first threshold value TH1 (No at Step S208), the input control unit 10B determines whether the accuracy of the first character recognition process is less than a second threshold value TH2 at Step S214. The threshold value TH2 is used to determine whether the accuracy is insufficient and the character not to be recognized by the first character recognition process is likely to be input, and is set to be less than the first threshold value TH1.

When the accuracy of the first character recognition process is less than the second threshold value TH2, that is, when the accuracy of the first character recognition process is insufficient and the character not to be recognized by the first character recognition process is likely to be input (Yes at Step S214), the input control unit 10B determines whether the accuracy of the second character recognition process is greater than a third threshold value TH3 at Step S215. The threshold value TH3 is used to determine whether the accuracy is sufficiently high. Since the number of characters recognized by the second character recognition process is more than that of characters by the first character recognition process and the recognition accuracy of the second character recognition process is lower than that of the first character recognition process, the threshold value TH3 may be less than the threshold value TH1.

When the accuracy of the second character recognition process is greater than the third threshold value TH3, that is, when the accuracy of the second character recognition process is sufficiently high (Yes at Step S215), the input control unit 10B displays the input screen (for example, the note pad screen 20B) corresponding to the second character recognition process on the touch panel 2 at Step S216.

Then, at Step S217, the input control unit 10B changes the keyboard 13A to the mode corresponding to the second character recognition process. Since the second character recognition process is a character recognition process in which an alphabet is included in a recognition target, the mode corresponding to the second character recognition process is preferably the alphabet mode.

Then, at Step S218, the input control unit 10B determines whether the number of recognized characters is greater than a predetermined value. The number of recognized characters means the number of characters stored in the second buffer 11B which is a buffer corresponding to the second character recognition process. When the number of recognized characters is greater than the predetermined value (Yes at Step S218), the input control unit 10B invalidates the first character recognition process at Step S219. When the number of recognized characters is not greater than the predetermined value (No at Step S218), the input control unit 10B maintains the first character recognition process to be valid.

Then, at Step S213, the input control unit 10B outputs the content of the first buffer 11A or the second buffer 11B corresponding to the input screen displayed on the touch panel 2 to the input screen and ends the input control process.

When the accuracy of the second character recognition process is less than the third threshold value TH3, that is, when the accuracy of both the first character recognition process and the second character recognition process is insufficient (No at Step S215), the input control unit 10B displays an error message indicating that it is difficult to correctly recognize the input character and ends the input control process at Step S220.

When the accuracy of the first character recognition process is less than the first threshold value TH1 and is greater than the second threshold value TH2, that is, when the accuracy of the first character recognition process is at a medium level and it is unclear whether the character can be correctly recognized (No at Step S214), the input control unit 10B displays both the input screen corresponding to the first character recognition process and the input screen corresponding to the second character recognition process on the touch panel 2 at Step S221. Then, at Step S213, the input control unit 10B outputs the content of the buffers corresponding to each input screen displayed on the touch panel 2 to the corresponding input screens and ends the input control process.

As described above, in this embodiment, the execution of the first character recognition process and the second character recognition process is controlled on the basis of the accuracy of correctly recognizing characters. Therefore, it is possible to change the character to be recognized by the character recognition process of the handwriting method to a desired character, while suppressing an increase in the burden of the user.

The aspect of the invention according to the above-described embodiment can be arbitrarily modified without departing from the scope of the invention. In the above-described embodiment, the mobile phone 1 includes the physical keyboard 13A. However, the mobile phone 1 may include a virtual keyboard which is displayed on the touch panel 2.

In the above-described embodiment, the character input program 12C is executed to implement the functions of the character recognition processing unit 10A and the input control unit 10B. However, the character recognition processing unit 10A and the input control unit 10B may be implemented by a wired logic. The character input program 12C may be divided into a plurality of programs or it may be integrated with another program.

In the above-described embodiment, when the kind of information to be input by the user is unclear, two types of character recognition processes are performed. However, three or more types of character recognition processes may be performed.

In the above-described embodiment, it is premised that the characters to be recognized by the first character recognition process are included in the characters to be recognized by the second character recognition process. However, even when there is no inclusion relation between the characters to be recognized by the first character recognition process and the characters to be recognized by the second character recognition process, the invention can be applied. For example, there is no inclusion relation between the characters to be recognized by the first character recognition process and the characters to be recognized by the second character recognition process when the first character recognition process recognizes numbers and the second character recognition process recognizes the alphabet.

Figure 12:
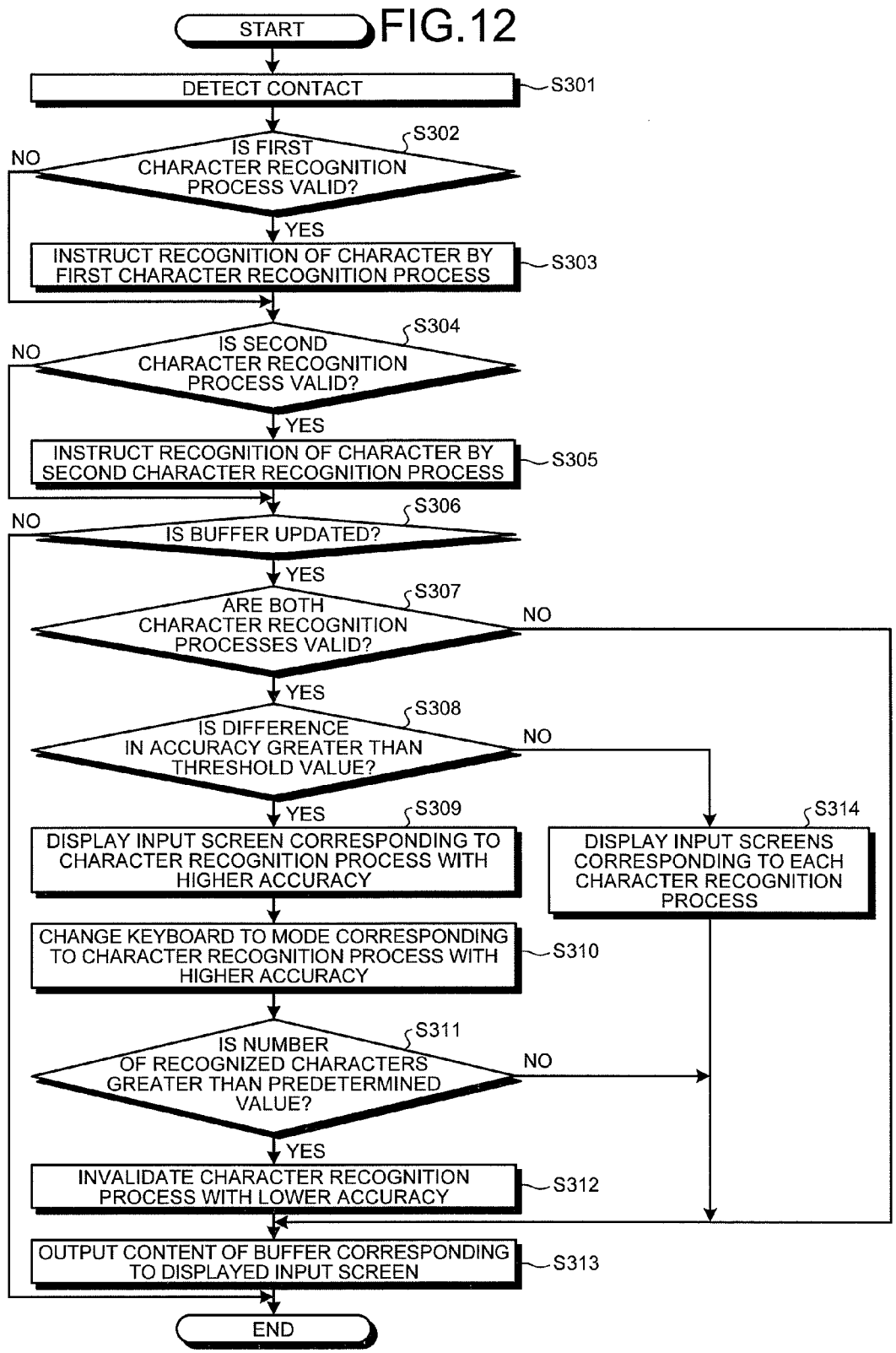
FIG. 12 is a flowchart illustrating a modification of the procedure of the input control process.

When there is no inclusion relation between the characters to be recognized by the first character recognition process and the characters to be recognized by the second character recognition process, the procedure of the input control process illustrated in FIG. 11 may be changed to that illustrated in FIG. 12.

FIG. 12 is a flowchart illustrating a modification of the procedure of the input control process performed by the input control unit 10B when the kind of information to be input by the user is unclear. The input control unit 10B performs the procedure illustrated in FIG. 12 whenever a new contact for handwriting a character is detected in the touch panel 2.

As illustrated in FIG. 12, when a new contact with the touch panel 2 is detected at Step S301, the input control unit 10B determines whether the first character recognition process is valid at Step S302. When the first character recognition process is valid (Yes at Step S302), the input control unit 10B instructs the character recognition processing unit 10A to recognize a character using the first character recognition process at Step S303. In response to the instruction, the character recognition processing unit 10A performs the character recognition process illustrated in FIG. 10 in order to recognize a character using the first character recognition process. When the first character recognition process is invalid (No at Step S302), the input control unit 10B does not instruct the recognition of a character by the first character recognition process.

Then, at Step S304, the input control unit 10B determines whether the second character recognition process is valid. When the second character recognition process is valid (Yes at Step S304), the input control unit 10B instructs the character recognition processing unit 10A to recognize a character using the second character recognition process at Step S305. In response to the instruction, the character recognition processing unit 10A performs the character recognition process illustrated in FIG. 10 in order to recognize a character using the second character recognition process. When the second character recognition process is invalid (No at Step S304), the input control unit 10B does not instruct the recognition of a character by the second character recognition process.

Then, at Step S306, the input control unit 10B determines whether at least one of the first buffer 11A and the second buffer 11B is updated along with the execution of the character recognition process. The update of at least one of the first buffer 11A and the second buffer 11B means that a new character is recognized. When neither the first buffer 11A nor the second buffer 11B is updated (No at Step S306), the input control unit 10B ends the input control process.

When at least one of the first buffer 11A and the second buffer 11B is updated (Yes at Step S306), the input control unit 10B determines whether both the first character recognition process and the second character recognition process are valid at Step S307. That both the first character recognition process and the second character recognition process are valid means that the kind of information to be input by the user is still unclear.

When the first character recognition process or the second character recognition process is invalid, that is, when the kind of information to be input by the user is determined and the character recognition process and the input screen corresponding to the kind of information to be input by the user are selected (No at Step S307), the input control unit 10B outputs the content of the first buffer 11A or the second buffer 11B corresponding to the input screen displayed on the touch panel 2 to the input screen and ends the input control process at Step S313.

On the other hand, when both the first character recognition process and the second character recognition process are valid (Yes at Step S307), the input control unit 10B tries to determine the kind of information to be input by the user, as follows.

First, at Step S308, the input control unit 10B determines whether the difference between the accuracy of the first character recognition process and the accuracy of the second character recognition process is greater than a predetermined threshold value. The threshold value is a sufficiently large value to clearly determine whether the character input by the user is the character to be recognized by the first character recognition process or the character to be recognized by the second character recognition process. It is preferable that the accuracy of the character recognition process be the representative value (for example, the average value or the minimum value) or the cumulative total value of the accuracy which is associated with each character stored in the corresponding buffer. It is preferable that the character input from the keyboard 13A be not reflected in the evaluation of accuracy.

When the difference in the accuracy is greater than the threshold value (Yes at Step S308), the input control unit 10B displays the input screen corresponding to the character recognition process with higher accuracy on the touch panel 2 at Step S309. In addition, at Step S310, the input control unit 10B changes the keyboard 13A to the mode corresponding to the character recognition process with higher accuracy.

Then, at Step S311, the input control unit 10B determines whether the number of recognized characters is greater than a predetermined value. The number of recognized characters means the number of characters stored in the buffer corresponding to the character recognition process with high accuracy. When the number of recognized characters is greater than the predetermined value (Yes at Step S311), the input control unit 10B invalidates the character recognition process with lower accuracy at Step S312. When the number of recognized characters is not greater than the predetermined value (No at Step S311), the input control unit 10B maintains the character recognition process with lower accuracy to be valid.

Then, at Step S313, the input control unit 10B outputs the content of the first buffer 11A or the second buffer 11B corresponding to the input screen displayed on the touch panel 2 to the input screen and ends the input control process.

When the difference in the accuracy is less than the threshold value (No at Step S308), the input control unit 10B displays both the input screen corresponding to the first character recognition process and the input screen corresponding to the second character recognition process on the touch panel 2 at Step S314. Then, at Step S313, the input control unit 10B outputs the content of the buffers corresponding to each input screen which is displayed on the touch panel 2 to the corresponding input screens and ends the input control process.

As another modification, the candidates of the input character may be displayed on the touch panel 2 and the kind of information to be input by the user may be determined on the basis of one of the candidates which is selected by the user.

Figure 13:
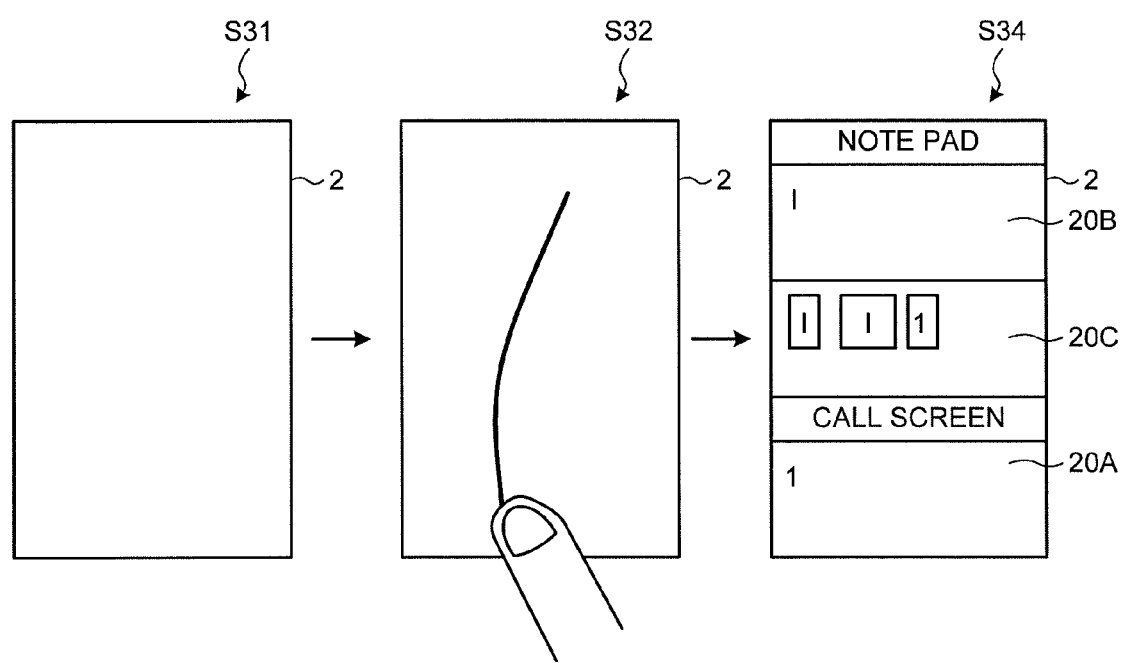
FIG. 13 is a diagram illustrating the operation of the mobile phone when the kind of information to be input by the user is determined on the basis of a selected candidate.

FIG. 13 is a diagram illustrating the operation of the mobile phone 1 when the kind of information to be input by the user is determined on the basis of the selected candidate. Steps S31 and S32 are the same as those illustrated in FIG. 5 and the description thereof will not be repeated.

It is assumed that a vertically long line is handwritten and the second character recognition process recognizes a capital letter "I" and a small letter "l" with the same level of accuracy at Step S32. In addition, it is assumed that the first character recognition process recognizes number "1" with a medium level of accuracy. In this case, at Step S34, the input control unit 10B displays "I", "l", and "1" as the candidates of the handwritten character on an input character candidate display region 20C of the touch panel 2.

when a tap to the display region of "I" or "l" is detected by the touch panel 2, the input control unit 10B determines that the user is about to input the character to be recognized by the second character recognition process. Then, the input control unit 10B adds the character which is displayed in the tapped region to the note pad screen 20B and removes the outgoing call number input screen 20A.

On the other hand, when a tap to the display region of "1" is detected by the touch panel 2, the input control unit 10B determines that the user is about to input the character to be recognized by the first character recognition process. Then, the input control unit 10B adds the character which is displayed in the tapped region to the outgoing call number input screen 20A and removes the note pad screen 20B.

As such, the candidates of the handwritten character are displayed such that the user selects one of the candidates. Therefore, it is possible to correctly recognize the input character and determine the kind of information to be input by the user on the basis of the type of character recognition process required to recognize the selected candidate.

In the example illustrated in FIG. 13, both the recognition result of the first character recognition process and the recognition result of the second character recognition process are displayed in the input character candidate display region 20C. However, only the recognition result of one character recognition process may be displayed in the input character candidate display region 20C. Alternatively, the recognition result of the first character recognition process and the recognition result of the second character recognition process may be displayed in different regions. When the same character is included in the recognition result of the first character recognition process and the recognition result of the second character recognition process and the user selects the character, it may be considered that the user inputs the character to be recognized by the character recognition process with a small number of characters to be recognized.

When both the input screen corresponding to the first character recognition process and the input screen corresponding to the second character recognition process are displayed, only one of the input screens may be displayed on the basis of the next recognized character (second recognized character).

The invention claimed is:

1. A character input device, comprising:
   a display unit;
   a touch sensor for detecting a contact with a surface thereof;
   a character recognition processing unit for performing a first character recognition process for recognizing a character used for a first function and a second character recognition process for recognizing a character used for a second function, on the basis of a locus connecting positions where the contact is detected by the touch sensor; and
   an input control unit for displaying, on the display unit, a first input screen for the first function onto which the character recognized by the first character recognition process is input and/or a second input screen for the second function onto which the character recognized by the second character recognition process is input, wherein
   the input control unit is configured to,
      upon displaying the first input screen, output the character recognized by the first character recognition process onto the first input screen, and
      upon displaying the second input screen, output the character recognized by the second character recognition process onto the second input screen.

2. The character input device according to claim 1, wherein the input control unit is configured to display only one of the first input screen and the second input screen on the display unit when a second character is recognized by at least one of the first character recognition process and the second character recognition process.

3. A character input device, comprising:
   a display unit;
   a touch sensor for detecting a contact with a surface thereof;
   a character recognition processing unit for performing a first character recognition process for recognizing a character used for a first function and a second character recognition process for recognizing a character used for a second function, on the basis of a locus connecting positions where the contact is detected by the touch sensor; and
   an input control unit for displaying, on the display unit, a first input screen for the first function onto which the character recognized by the first character recognition process is input and/or a second input screen for the second function onto which the character recognized by the second character recognition process is input, wherein
   the input control unit is configured to display the first input screen and/or the second input screen on the display unit, on the basis of a recognition accuracy of the character by the first character recognition process and a recognition accuracy of the character by the second character recognition process.

4. The character input device according to claim 3, wherein the input control unit is configured to
   display the first input screen when the recognition accuracy of the character by the first character recognition process is greater than a threshold value, and
   display the second input screen when the recognition accuracy of the character by the first character recognition process is less than the threshold value.

5. The character input device according to claim 3, wherein the input control unit is configured to
   display the first input screen when the recognition accuracy of the character by the first character recognition process is greater than a first threshold value,
   display the second input screen when the recognition accuracy of the character by the first character recognition process is less than a second threshold value set to be less than the first threshold value, and
   display both the first input screen and the second input screen when the recognition accuracy of the character by the first character recognition process is between the first threshold value and the second threshold value.

6. A character input device, comprising:
   a display unit;
   a touch sensor for detecting a contact with a surface thereof;
   a character recognition processing unit for performing a first character recognition process for recognizing a character used for a first function and a second character recognition process for recognizing a character used for a second function, on the basis of a locus connecting positions where the contact is detected by the touch sensor; and
   an input control unit for displaying, on the display unit, a first input screen for the first function onto which the character recognized by the first character recognition process is input and/or a second input screen for the second function onto which the character recognized by the second character recognition process is input, wherein
   the first function is a telephone function, and
   the character recognition processing unit is configured to recognize a number using the first character recognition process.

7. The character input device according to claim 6, wherein the second function is a function different from the telephone function, and
   the character recognition processing unit is configured to recognize a number and other characters using the second character recognition process.

8. The character input device according to claim 3, wherein the input control unit is configured to
   display both the first input screen and the second input screen when a difference between the recognition accuracy of the character by the first character recognition process and the recognition accuracy of the character by the second character recognition process is less than a predetermined threshold value, and display only one of the first input screen and the second input screen which corresponds to the character recognition process with the higher recognition accuracy of the character when the difference between the recognition accuracy of the character by the first character recognition process and the recognition accuracy of the character by the second character recognition process is greater than the predetermined threshold value.

9. A character input device, comprising:
a display unit;
a touch sensor for detecting a contact with a surface thereof;
a character recognition processing unit for performing a first character recognition process for recognizing a character used for a first function and a second character recognition process for recognizing a character used for a second function, on the basis of a locus connecting positions where the contact is detected by the touch sensor; and
an input control unit for displaying, on the display unit, a first input screen for the first function onto which the character recognized by the first character recognition process is input and/or a second input screen for the second function onto which the character recognized by the second character recognition process is input, wherein
the input control unit is configured to
display, when both the first input screen and the second input screen are displayed, at least one of the character recognized by the first character recognition process and the character recognized by the second character recognition process as candidates of the input character on the display unit, and
display, when any one of the candidates is selected, only one of the first input screen and the second input screen which corresponds to the character recognition process by which the selected candidate is recognized.

10. The character input device according to claim 3, wherein
the input control unit is configured to
process a cumulative total value or a representative value of the recognition accuracy of the character recognized by the first character recognition process as the recognition accuracy of the character by the first character recognition process, and
process a cumulative total value or a representative value of the recognition accuracy of the character recognized by the second character recognition process as the recognition accuracy of the character by the second character recognition process.

11. A character input device, comprising:
a display unit;
a touch sensor for detecting a contact with a surface thereof;
a character recognition processing unit for performing a first character recognition process for recognizing a character used for a first function and a second character recognition process for recognizing a character used for a second function, on the basis of a locus connecting positions where the contact is detected by the touch sensor; and
an input control unit for displaying, on the display unit, a first input screen for the first function onto which the character recognized by the first character recognition process is input and/or a second input screen for the second function onto which the character recognized by the second character recognition process is input, wherein,
when the number of characters recognized by the first character recognition process or the second character recognition process is greater than a predetermined value,
the input control unit is configured to stop one of the first character recognition process and the second character recognition process which has lower character recognition accuracy.

12. A character input device, comprising:
a display unit;
a touch sensor for detecting a contact with a surface thereof;
a character recognition processing unit for performing a first character recognition process for recognizing a character used for a first function and a second character recognition process for recognizing a character used for a second function, on the basis of a locus connecting positions where the contact is detected by the touch sensor;
an input control unit for displaying, on the display unit, a first input screen for the first function onto which the character recognized by the first character recognition process is input and/or a second input screen for the second function onto which the character recognized by the second character recognition process is input; and
a keyboard configured to be changed to a first mode for inputting the character used for the first function or a second mode for inputting the character used for the second function, wherein
the input control unit is configured to
upon displaying only the first input screen of the first and second input screens, change the keyboard to the first mode, and
upon displaying only the second input screen, change the keyboard to the second mode.

13. A character input device, comprising:
a display unit;
a touch sensor for detecting a contact with a surface thereof;
a character recognition processing unit for recognizing a character on the basis of a locus connecting positions where the contact is detected by the touch sensor; and
an input control unit configured to
display a screen for a first function to which the character recognized by the character recognition processing unit is input on the display unit when the character is used for the first function, and
display a screen for a second function to which the character recognized by the character recognition processing unit is input on the display unit when the character is used for the second function, wherein
the input control unit is configured to display both the screen for the first function and the screen for the second function on the display unit when it is not determined whether the character recognized by the character recognition processing unit is the character used for the first function or the character used for the second function.

14. The character input device according to claim 13, wherein,
in a case in which both the screen for the first function and the screen for the second function are displayed on the display unit, the input control unit is configured to
- display, when the next character recognized by the character recognition processing unit is the character used for the first function, only the screen for the first function to which the character is input on the display unit, and
- display, when the next character recognized by the character recognition processing unit is the character used for the second function, only the screen for the second function to which the character is input on the display unit.

\* \* \* \* \*